(12) United States Patent
MacDougall et al.

(10) Patent No.: US 11,159,858 B1
(45) Date of Patent: Oct. 26, 2021

(54) RELATIVE PROMINENCE OF ELEMENTS WITHIN AN ADVERTISEMENT

(71) Applicant: AT&T Intellectual Property I, L.P., Atlanta, GA (US)

(72) Inventors: Alexander MacDougall, Newnan, GA (US); Anna Lidzba, Atlanta, GA (US); Nigel Bradley, Canton, GA (US); James Carlton Bedingfield, Sr., Gainesville, GA (US); Robert Koch, Norcross, GA (US); Ari Craine, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/843,539

(22) Filed: Apr. 8, 2020

(51) Int. Cl.
| | |
|---|---|
| *H04N 21/81* | (2011.01) |
| *H04N 21/44* | (2011.01) |
| *G06Q 30/02* | (2012.01) |
| *H04N 21/439* | (2011.01) |
| *H04N 21/45* | (2011.01) |

(52) U.S. Cl.
CPC ....... *H04N 21/812* (2013.01); *G06Q 30/0254* (2013.01); *H04N 21/439* (2013.01); *H04N 21/44016* (2013.01); *H04N 21/4532* (2013.01)

(58) Field of Classification Search
CPC .............. H04N 21/812; H04N 21/439; H04N 21/4532; H04N 21/44016; G06Q 30/0254
See application file for complete search history.

(56) References Cited

U.S. PATENT DOCUMENTS

| | | |
|---|---|---|
| 8,085,920 B1 | 12/2011 | Bedingfield, Sr. et al. |
| 2003/0028873 A1 | 2/2003 | Lemmons et al. |

*Primary Examiner* — Anthony Bantamoi
(74) *Attorney, Agent, or Firm* — Guntin & Gust, PLC; John G. Rauch

(57) ABSTRACT

Aspects of the subject disclosure may include, for example, providing to a user device a video content item including at least one scene which includes a plurality of advertisement placement opportunities and determining a preference profile for an individual associated with the user device. Aspects further include selecting a group of matching advertisements having advertisement profiles that match the preference profile for the individual and determining a relative prominence score for each advertisement placement opportunity. Aspects further include ordering the matching advertisements according to prominence information specified for each matching advertisement, wherein the prominence information corresponds to a relative desired prominence specified by an advertiser associated with the matching advertisement. Aspects further include providing the ordered matching advertisements to the user device according to the respective prominence information so that a matching advertisement having a greatest desired prominence is displayed in the video content item at an advertisement placement opportunity having a highest relative prominence score. Other embodiments are disclosed.

20 Claims, 10 Drawing Sheets

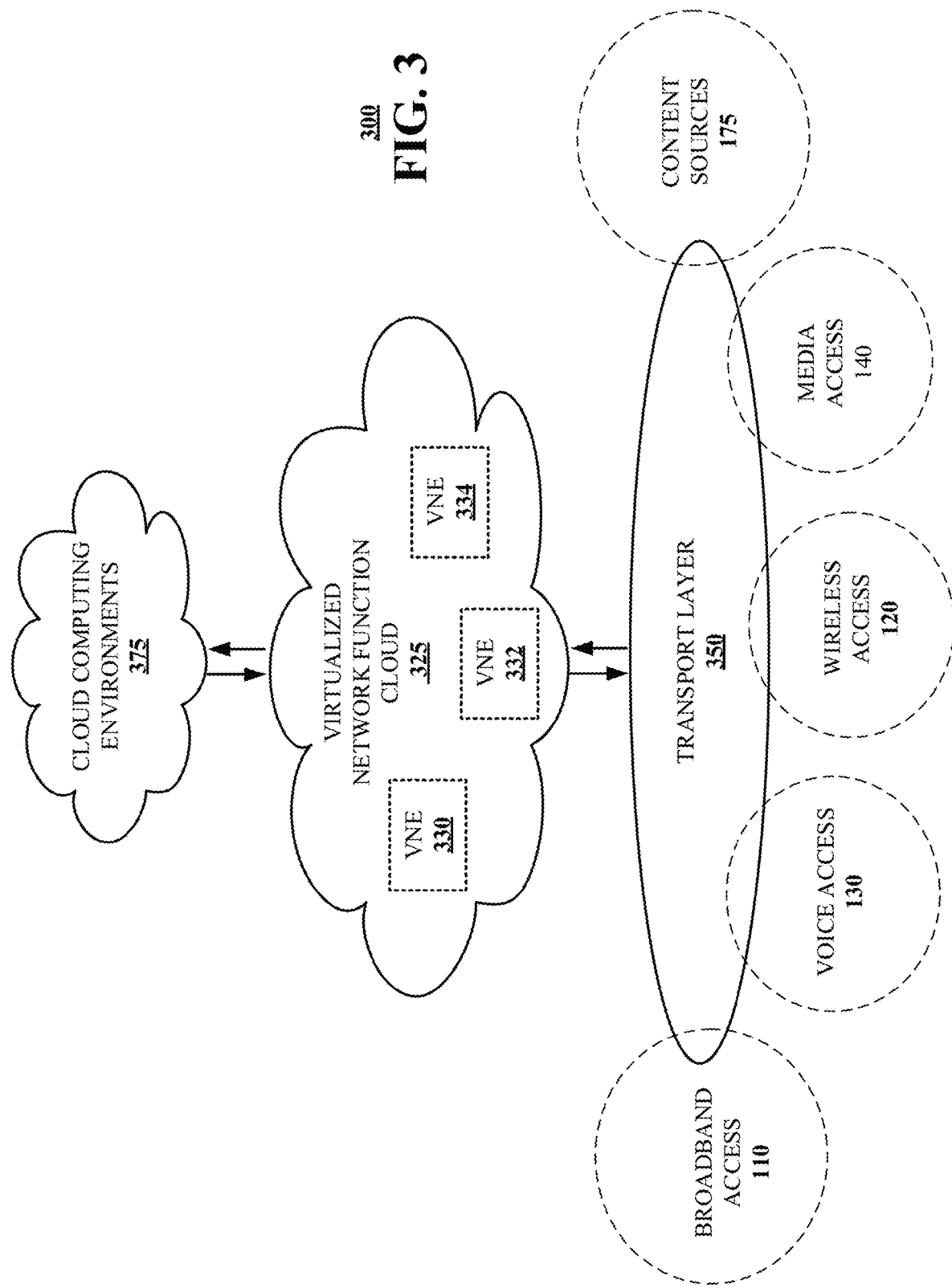

RELATIVE PROMINENCE OF ELEMENTS WITHIN AN ADVERTISEMENT

FIELD OF THE DISCLOSURE

The subject disclosure relates to relative prominence of elements within an advertisement within a displayed video item.

BACKGROUND

Display of content items such as advertising within a video or other content is known, for example for targeting the content items to specific audiences or viewers. Such display has been used to insert product placement into content such as films or to modify product placement from one product to another.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
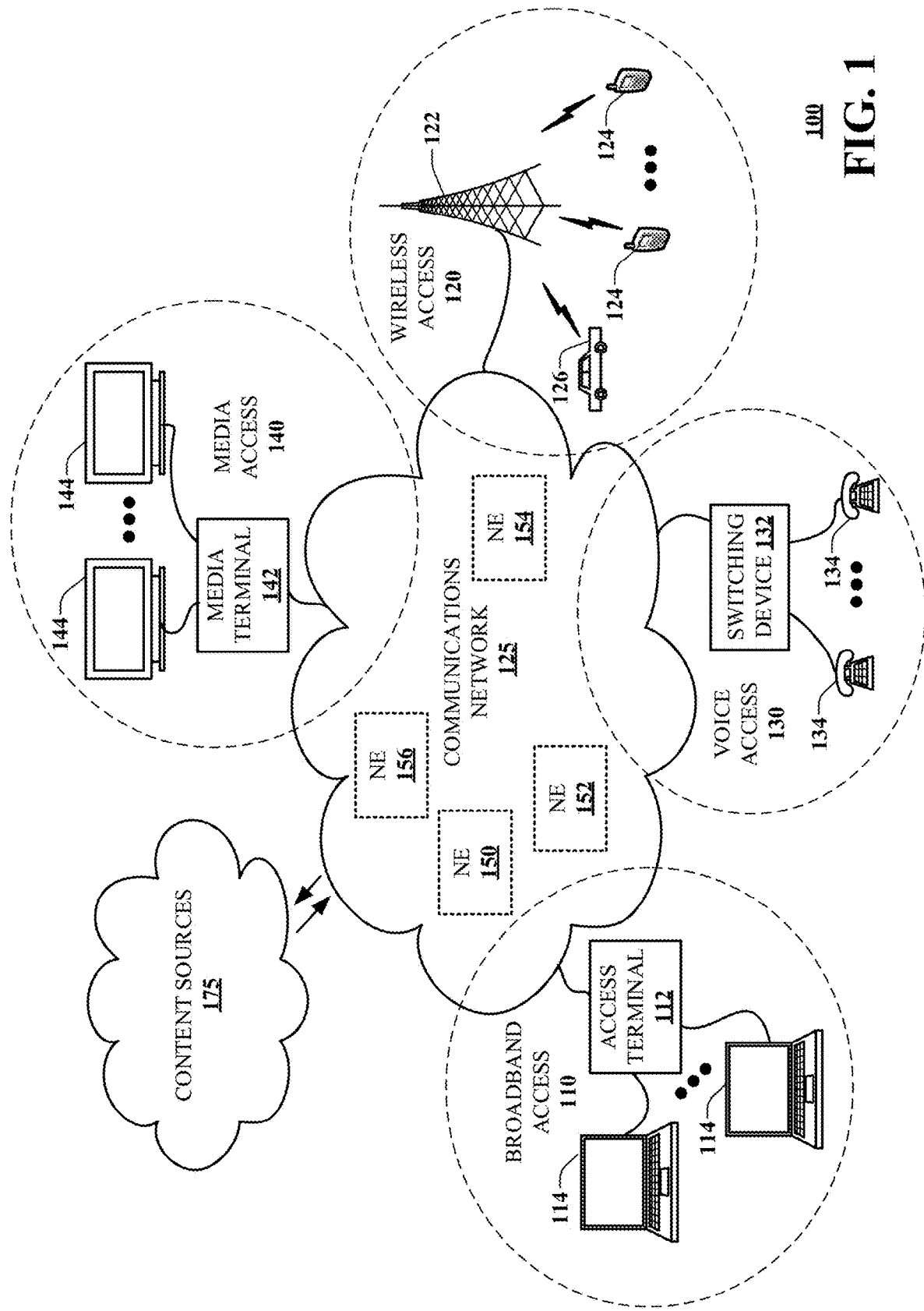
FIG. 1 is a block diagram illustrating an exemplary, non-limiting embodiment of a communications network in accordance with various aspects described herein.

The subject disclosure describes, among other things, illustrative embodiments for determining how to present content elements within a combined content item with varying relative levels of prominence among the content elements. Presentation may be based on aggregate viewership of content elements or based on a specific viewer. Other embodiments are described in the subject disclosure.

One or more aspects of the subject disclosure include receiving, over a network, a request to deliver media content to a media display device and detecting a plurality of content placement opportunities in the media content. Aspects further include determining, for each content placement opportunity, a relative prominence score, including determining the relative prominence score based on a relative importance in a scene of the respective content placement opportunity. Aspects further include delivering the media content over the network to the media display device and selecting a plurality of content items to include in the media content. Selecting the content items includes selecting a respective content item for each respective content placement opportunity of the plurality of content placement opportunities according to the respective relative prominence score for the respective content placement opportunity. Each respective content item is delivered over the network to the media display device.

One or more aspects of the subject disclosure include providing a content item to a media display device and detecting a plurality of content placement opportunities in a scene of the content item, where each respective content placement opportunity of the plurality of content placement opportunities has a relative prominence in the scene of the content item. Aspects further include detecting a preference profile for a user of the media display device and identifying a first plurality of matching advertising items that match the preference profile for the user. Aspects further include selecting a second plurality of matching advertising items according to respective prominence information of the first plurality of matching advertising items and providing the second plurality of matching advertising items to the media display device. Each respective matching advertising item of the second plurality of matching advertising items is associated with a respective content placement opportunity of the plurality of content placement opportunities.

One or more aspects of the subject disclosure include, for example, providing to a user device a video content item including at least one scene which includes a plurality of advertisement placement opportunities and determining a preference profile for an individual associated with the user device. Aspects further include selecting a group of matching advertisements having advertisement profiles that match the preference profile for the individual and determining a relative prominence score for each advertisement placement opportunity. Aspects further include ordering the matching advertisements according to prominence information specified for each matching advertisement, wherein the prominence information corresponds to a relative desired prominence specified by an advertiser associated with the matching advertisement. Aspects further include providing the ordered matching advertisements to the user device according to the respective prominence information so that a matching advertisement having a greatest desired prominence is displayed in the video content item at an advertisement placement opportunity having a highest relative prominence score.

Referring now to FIG. 1, a block diagram is shown illustrating an example, non-limiting embodiment of a communications network 100 in accordance with various aspects described herein. For example, communications network 100 can facilitate in whole or in part providing a content item such as a video or other media content item to audio/video display devices 144, data terminals 114, or other network elements 150, 152, 154, 156 wherein the content item includes a plurality of content placement opportunities which each have a relative prominence in a scene or portion of the content item, and providing advertisements or other content items according to desired prominence so that, for example, an advertisement having a highest desired prominence by an advertiser is placed most prominently in the content item.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
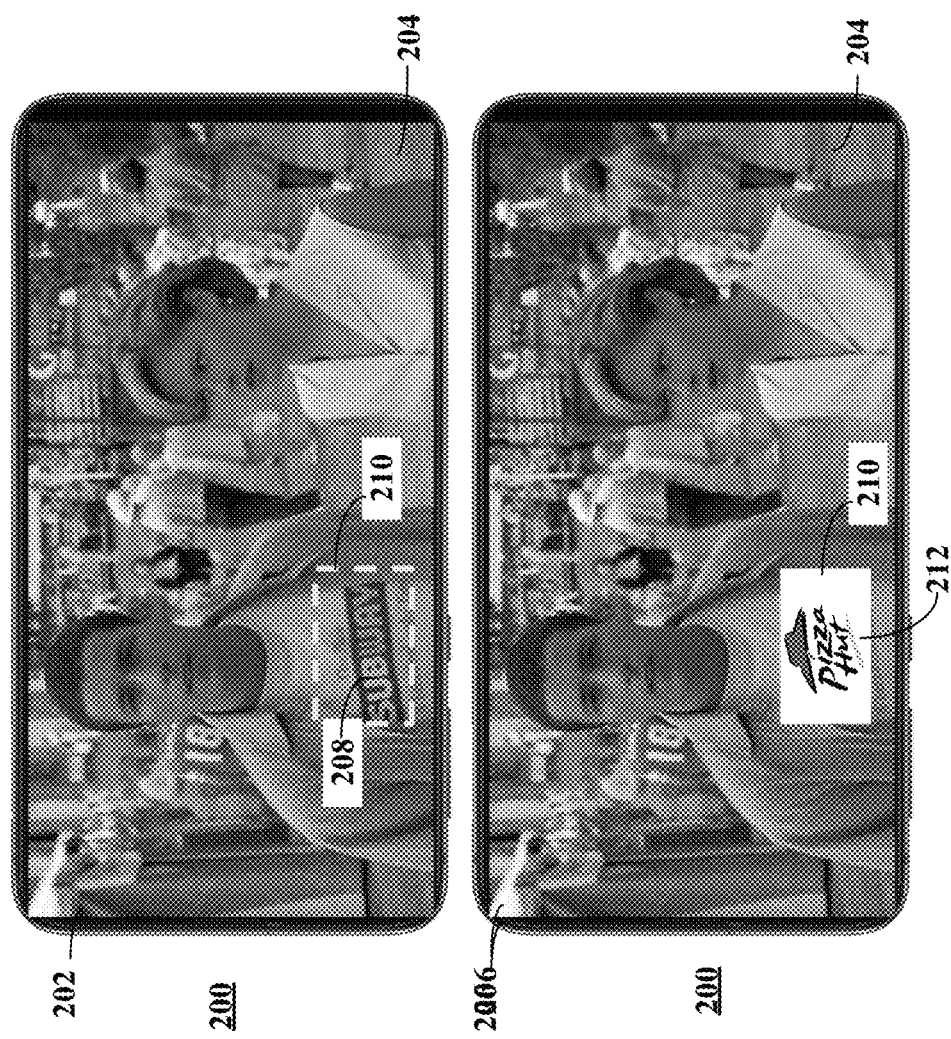
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of displaying a content item while delivering media content to a media display device in a system functioning within the communication network of FIG. 1 in accordance with various aspects described herein. In FIG. 2A, a user device 200 is displaying a first image 202 of a content item 204. Also in FIG. 2A, by way of contrast, the user device 200 displays a second image 206 including the same content item 204. The user device 200 in the illustrated example is a portable device such as a mobile telephone. The user device 200 includes a display screen suitable to display content items such as the images 202, 206 and the content item 204. The user device 200 may further include a connection to a remote network for receiving content items such as the images 202, 206 and the content item 204. Further, the user device 200 may further include a memory for storing content items such as the images 202, 206 and the content item 204.

The content item 204 in the example includes an image of a man and a woman dressed in casual clothes. He wears an open shirt with a collar over a t-shirt. They stand facing the camera in front of a grassy area populated by other people who generally have their backs to the camera. Some of the other people appear to be in motion, either toward the camera or away from the camera. The man and the woman appear to be talking. He looks past the camera, she looks at him. The content item 204 may be a still image or may be a frame or image from a motion picture, television program, video game or other similar content. The details of the content item are important primarily as an illustrative example. The details and various aspects of the embodiments discussed herein may be extended to the widest variety of content items including video, still images, audio, text and other content types as well.

In the first image 202 of FIG. 2A, the front of the man's t-shirt is partially visible. It bears a first logo 208 and name of a first restaurant chain. In one embodiment, the first logo is part of the content of the first image 202 and the content item 204. That is, for example, in a film incorporating the first image 202, the man is wearing a shirt that actually includes the first logo 208. The first logo 208 is part of the content of the first image 202 or of the content item 204 such as the video incorporating the image 202. In another embodiment, the first logo 208 is located in an area 210 of the first image 202 that has been marked for insertion of one or more content items. The area 210 may be added to the first image 202 or content item 204 in order to receive the one or more content items. In the second image 206 of FIG. 2A, a second logo 212 of a second restaurant chain appears in the area 210. The second logo 212 may be superimposed on the first logo 208 in the second image of the content item 204. The second image 206 may be altered relative to the first image 202, for example, by altering the content of the first image 202 to produce the second image 206. This may be done in various examples my modifying pixels or frames or other encoded elements of the first image 202 to produce the second image 206.

Substitution of a content element such as the second logo 212 for another content element such as the first logo 208 may be done for any suitable reason. In one example, the substitution may be done to target advertising to specific audiences or specific viewers. The substitution may be made to change a product placement in a movie or other video content. The substitution may be made by defining one or more screen areas such as area 210 that may be digitally changed. The change may be done either in advance or in real-time as the viewer is viewing the content including the advertising. When the change is done in advance, the content including the modified frames with image 206 may be communicated to the user device 200 or another location for storage and subsequent playback. When the change is done in real time, the substitution of the second logo 212 for the first logo 208 may be made according to a bidding process among advertisers for the opportunity to place a content item such as the second logo 212 in the area 210. The bidding process may match aspects of a viewer of the content item with aspects of a product or service being advertised or marketed by the advertiser. Selection of a particular content item to target advertising to specific audiences or specific viewers may be based, for example, on the advertiser's willingness to have an advertisement appear in the area 210, either by paying more to appear in the area 210 or in some other way. The bidding process may occur substantially in real time as the content is conveyed to the user device 200 and viewer. In other examples, other than substantially in real time, a user device such as a mobile begins streaming a movie which is know to have a predetermined number of content insertion opportunities to receive advertising or other content. In such an example, bidding may begin at the time of initiating the streaming and if the scene is eventually streamed then the object is added and the winning bidder is charged for the impression.

Figure 2B:
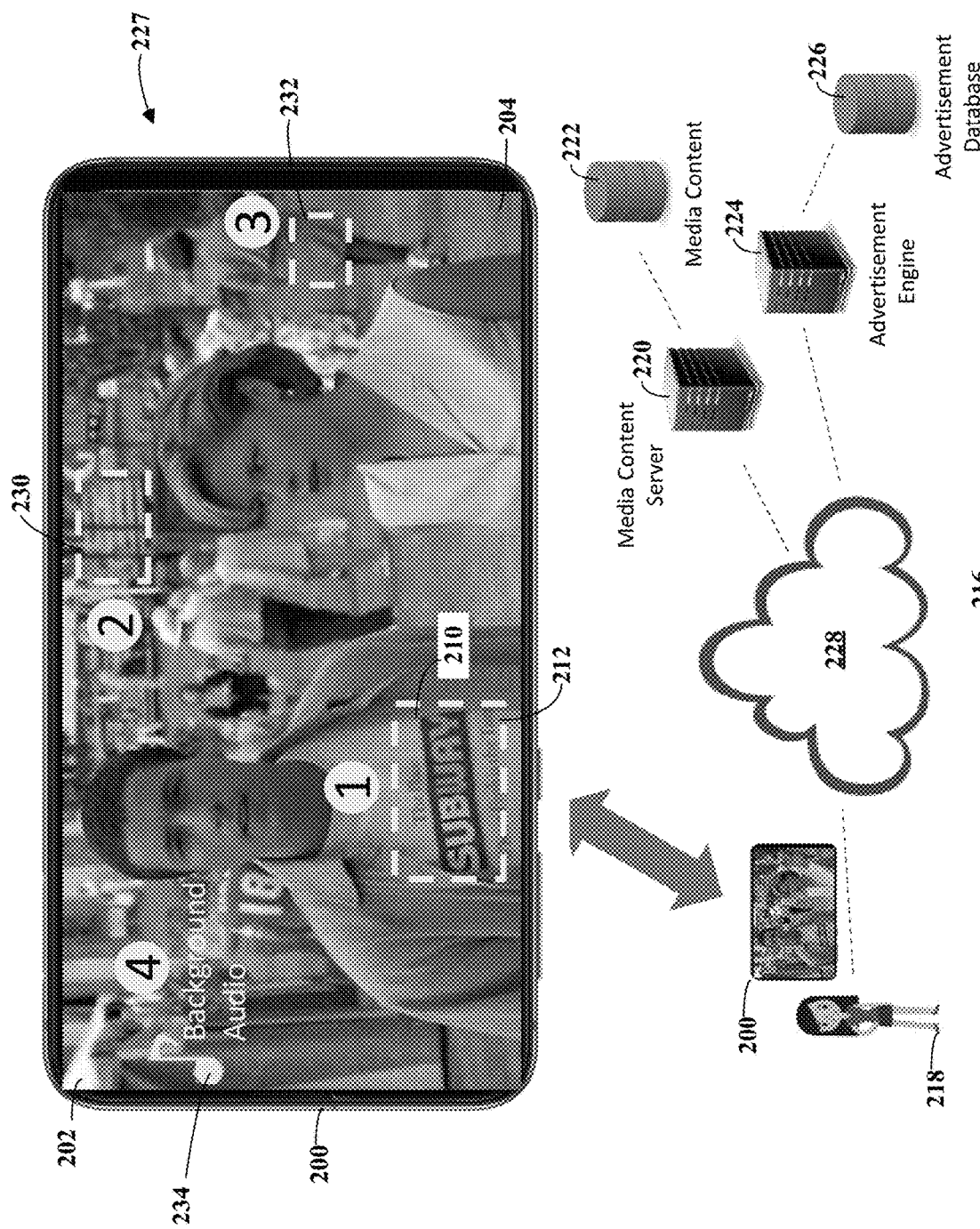
FIG. 2B is a block diagram illustrating an example, non-limiting embodiment of a system for displaying a content item while delivering media content to a media display device such as user device and functioning within the communication network of FIG. 1 in accordance with various aspects described herein.

FIG. 2B is a block diagram illustrating an example, non-limiting embodiment of a system 216 for displaying a content item while delivering media content to a media display device such as user device 200 and functioning within the communication network of FIG. 1 in accordance with various aspects described herein. In FIG. 2B, the user device 200 is associated with a user 218 and may be any device for displaying content including media for interaction by the user 218. Interaction by the user 218 may include seeing visual content and hearing audio content, as well as any other sensory perception such as response to a motion detection function of the user device or a motion creation device such as a vibrator of the user device. Interaction may also include manipulation of a user interface of the user device 200 to control the user device 200. The manipulation of the user interface of the user device may occur in any suitable fashion, such actuation of a touch-sensitive display screen or one or more buttons or switches of the user device 200, voice control of the user interface, or other techniques that may be developed.

Moreover, in other embodiments, the user 218 may have other user devices in addition to the user device 200. The user device 200 in the illustrated embodiment includes a mobile device such as a mobile telephone adapted for viewing content. The user device may be adapted for other functions as well, such as internet access and web page browsing, making radiotelephone calls, etc. In addition or instead, the user 218 may interact with content on other user devices such as a tablet computer, a laptop or desktop computer, a media player, a smart television, etc. The techniques described herein may be extended to the widest range of user devices or groups of user devices.

The system 216 in the exemplary embodiment of FIG. 2B includes a media content server 220 in communication with a media content database 222, an advertisement engine 224 in communication with an advertisement database 226. In other embodiments, the system 216 may include any suitable components in addition to or in place of those shown in FIG. 2B. In typical embodiments, the user 218 and the user device 200 represent one user of many users that may access the media content server 220 and the advertisement engine over the network 228.

The media content server 220 provides content to the network 228 for access by users such as the user 218. Access my include downloading an entire file or a partial file of content. Access may include streaming of content, in which the content is sent in portions from the media content server 220. The media content server 220 is in data communication with the media content database 222 to retrieve content and provide the content to the user device 200. Media content provided by the media content server 220 may include the widest variety of content, including video content and audio content. Video content may include video items such as films, television programs, animated items, for example, of any duration. Audio content may include music, voice or conversations or other captured sounds. Media content may include live items, such as items currently broadcast or narrowcast to an audience, or recorded items. Moreover, media content may include combinations of any of these, such as a transmission of a prerecorded sporting event with live voice-over commentary and music. The media content items may be conveyed over the network 228 to a single user, such as user 218, or be conveyed to an audience of users at specific network addresses, or may be broadcast to a broad audience over commercially available licensed broadcast channels.

The media content database 222 includes memory to store content such as video, audio and other content items. The media content database 222 may include any suitable number of disk drives and other data storage for storing content. Moreover, the media content database 222 or the media content server 220 may have access over networks such as the network 228 or other networks or devices to additional content that may be available for retrieval and storage at the media content database 222 for communication by the media content server 220 to an audience.

The advertisement engine 224 operates in conjunction with the advertisement database 226 to provide content items including advertisements to user devices such as the user device 200. The advertisement engine 224 in some embodiments operates in conjunction with the media content server 220 to provide the content items. For example, as the media content server 220 provides content to the user device 200, the media content server 220 may prompt the advertisement engine 224 to provide one or more advertisements or other content items to user devices such as the user device 200 in conjunction with the content. The advertisement engine 224 may retrieve the advertisement or other content item from the advertisement database 226. The advertisement database 226, similar to the media content database 222, may include any suitable combination of storage elements such as disk drives to store data including content items such as advertisements. The retrieved content item may be in the form of a data file or other data structure containing instructions and data to cause an advertisement or other content item to be produced on the user device 200. The advertisement or other content item may include one or more still images or video images. The advertisement or other content item may include audio such as music, speech or a combination.

In FIG. 2B, the first image 202 displays the content item 204. In the illustrated embodiment, the content item 204 includes a plurality of content placement points 227. The plurality of content placement points 227 in this example includes the area 210, an area 230 and an area 232 in the image 202 and an audio point 234 in which a content items may be placed dynamically. The plurality of content placement points 227 may include other defined boundaries as well, for audible, visual or other content item insertion.

The plurality of content placement points 227 represent content placement opportunities in the content item 204. As indicated, the content placement opportunities in this example may be visual or audible in nature. Visual opportunities may be a portion of the screen of the user device 200 that is prominent and part of a viewer's main attention or may be a background portion of the screen scene. Prominence may be relative and may have many factors. In the example of FIG. 2B, area 210 is in the foreground of the image 202 whereas area 230 and area 232 are in the background, and are therefore less prominent to a viewer of the content item 204. Further, area 210 is located on or near, or otherwise associated with, a character who is the focus of the viewer's attention, in this example because the man is speaking. Thus, area 210 has a higher relative prominence in the image 202. Area 230 is a relatively static area in the background of the image 202 while, in contrast, area 232 is a dynamic area in that the area 232 is on or associated with a moving object, a woman in the background if the image 202. Because movement or a moving object is more likely to command a viewer's attention, in some applications, the area 232 may have a higher relative prominence than the area 230. Further, the area 230 is larger, or occupies a larger portion of the image 202, than the area 232. Because of its larger relative size, the area 230 may have a higher relative prominence than the area 232.

Further, content items inserted into any of the plurality of content placement points 227 such as area 210, area 230 and area 232, may be given an enhanced relative prominence upon insertion into the image 202. For example, the color or appearance of the content item may be selected to cause it to be more prominent than surrounding areas of the image 202. In one example, if a content item is to be placed in a blank area that is colored green, such as a portion of lawn, the inserted content item may be colored red, or given a blue background behind white text, to appear relatively more prominent against the green background. In another example, where a scene shown in the image 202 is substantially dark, as a night scene, the inserted content item may be relatively brightly illuminated to command the viewer's attention. In yet another example, a content item may be presented with a dynamic sparkle or dazzle aspect to enhance its ability to attract the attention of the viewer. In yet another example, information known about a specific viewer may be used to enhance the relative prominence of a content placement point. For example, if it is known that a viewer attended a particular college or university, or lives in a particular town or neighborhood, the inserted content item may be combined with a visual depiction of that viewer-specific information. The enhancement of relative prominence for an inserted content item, or a content placement point, may be managed in any suitable way.

Further, each advertising or content placement opportunity may use additional metadata to describe its nature and its degree of prominence as a predictor of how much attention it may receive from a viewer. The relative degree of prominence may relate to a relative importance of an advertising or content placement opportunity in a scene or image. In other embodiments, the relative importance may relate to the degree of importance of an advertising or content placement opportunity across multiple or different scenes of the content item. A prominence score may be calculated for each ad opportunity by the media content server and inserted as metadata for the content. A prominence score for visual ad opportunities may be based on size, degree of importance to the scene, relative motion, and duration of time on screen, and other factors. In the example shown, for instance, scores might be as shown in the following Table 1.

TABLE 1

| Ad Opportunity | Size | Importance | Motion | Duration | Total |
|---|---|---|---|---|---|
| 1 | 8 | 10 | 3 | 10 | 31 |
| 2 | 5 | 3 | 0 | 10 | 18 |
| 3 | 3 | 3 | 9 | 4 | 19 |

In Table 1, each of the visual content placement opportunities is associated with a number shown in FIG. 2B. Thus, area 210 is represented in Table 1 by number 1; area 230 is represented in Table 1 as number 2; and area 232 is represented in Table 1 as number 3. Each visual content placement opportunity is given a relative prominence score for various aspects of prominence. In this example, the aspects of prominence which are scored include relative size of each opportunity, relative importance in a scene of each opportunity, relative motion of each opportunity, and duration of each opportunity. Thus, in the example of FIG. 2B, ad opportunity 1, for area 210, has a relative large size in the image 202 so it is give a size score of 2. Ad opportunity 1 further has a high relative importance, since it is in the foreground of the image 202 and associated with a character who is speaking, so it is given a relatively high score of 10. The ad opportunity 1 is not in motion, so it is given a relatively low score of 3. The ad opportunity 1 remains in the image 202 throughout the entire duration of the scene so it is given a relatively high duration score of 10. The other ad opportunities, labeled 2 and 3 in FIG. 2B and Table 1, are scored in similar fashion. A total score for each ad opportunity may be simple addition, as shown. Thus, ad opportunity 1 has a total score of 31, ad opportunity 2 has a total score of 18, and ad opportunity 3 has a total score of 19. In other examples, the respective scores for size, importance, motion and duration may be weighted or combined in some fashion. Other features, in addition to or instead of size, importance, motion and duration.

Audio insertion opportunities may be scored similarly. Relative prominence for audio ad insertion opportunities may be rated as peers of, or separately from, visual ad opportunities. In Table 2, audio ad insertion opportunities are added to Table 1 and are scored on factors including volume of the sounds, relevance to the scene or image, musicality and duration during the scene. In this example, audio ad insertion opportunity identified as number 4 in FIG. 2B is scored 4 for volume, 3 for relevance, 8 for musicality and 10 for duration. Other factors for scoring audio ad insertion opportunities may be used as well.

TABLE 1

| Ad Opportunity | Size | Importance | Motion | Duration | Total |
|---|---|---|---|---|---|
| 1 | 8 | 10 | 3 | 10 | 31 |
| 2 | 5 | 3 | 0 | 10 | 18 |
| 3 | 3 | 3 | 9 | 4 | 19 |
| | Volume | Relevance | Musicality | Duration | Total |
| 4 | 4 | 3 | 8 | 10 | 25 |

In other examples, scores for audio ad insertion opportunities may be determined and used as with the visual ad insertion opportunities. Thus, factors for scoring an audio ad insertion opportunity may include a relative importance of sound to a scene or image, apparent motion of a sound in the sound design for a scene, or duration of the sound or audio clip during a scene. The result is that an audio ad from the advertisement database is inserted, for instance, as background audio. In examples, this may be a product jingle, prerecorded audio that contains dialogue including a product name, or an artificial intelligence- or machine learning-generated audio dialogue that may contain, for instance, a product name or some known information about the viewer (as knowingly shared by the viewer), such as the name of the college the viewer attended.

As indicated, the system 216 may use artificial intelligence or machine learning, or a combination of these, to generate alternative visual or audible content items for insertion in content placement opportunities, either visual or audible. For example, a machine learning algorithm may be used to generate and insert dialogue from a character to include, for instance, a product name. This may be readily extended to other examples as well.

In addition or instead, an operator of the media content server 220 may desire to modify the selected content item for any suitable reason by inserting particular content items, rather than advertisements, in the identified content placement opportunities. In one example, the requested content item may be targeted to language learners and a content placement opportunity may include inserting dialog in a particular language selected for particular viewers choosing to learn a particular language. Any other suitable reason for modifying visual, audible and other aspects of a requested content item may prompt the use of content placement opportunities in the requested content item.

Any number of means may be used to determine preferences for an individual viewer and choosing the most appropriate ads to insert. The degree of prominence to be used for each ad may also include data from an advertisement engine, which may include relative levels that advertisers are willing to pay for their ads to be presented. For example, the highest paying advertiser whose ad is a match for the user's preference profile may be presented in Ad Opportunity 1 (the most prominent one). Accordingly, other opportunities are filled and the content is presented with the ads inserted.

Each of the plurality of content placement points 227, including area 210, area 230 and area 232, may be defined by a spatial location on the image 202 and a temporal location in the content item 204. Spatial locations may be defined in any suitable way, such as pixel location on the image 202, displacement from a defined origin, etc. Temporal locations may be similarly defined in any suitable fashion, such as start and stop times from a defined origin time of the content item, a start time plus a duration, etc. The media content may contain metadata such as timestamp tags that are used to demark when advertising or other content placement opportunities occur. Visual content placement may be done in any suitable fashion, such as by superimposing one visual item over a preexisting visual item in the image 202, such as substitution of the second logo 212 for the first logo 208 in the image 202. In another example, visual content placement may be done by superimposing a content item in a relatively blank space of the image 202, such as the area 230. Instead of superimposition, any suitable way of inserting visual content into the image 202 may be used. Any of the plurality of content placement points 227, including area 210, area 230 and area 232, may be used for insertion of a visual content item such as an advertisement.

Audible content placement opportunities may include background music or background dialogue. For a content item that represents an advertisement, audible content may be an advertiser's jingle or other song portion, or other audio component that provokes brand identification among listeners. In another example, an audible content item may include spoken words which may, for example, mention a product or brand by name in a way to attract the viewer's attention.

Similar to visual content items, audible content items and audio content points such as audio point 234 may be given an enhanced relative prominence. For example, an inserted content item at audio point may be presented at a higher volume relative to other sounds or audible content in a scene. In another example, an inserted content item at audio point 234 may be combined with another audible item calculated to capture audience attention, such as a tone or sound or portion of a well-known song. In yet another example, information known about a specific audience member may be used to enhance the relative prominence of an audible content placement item at, for example, audio point 234. For example, if it is known that an audience member attended a particular college or university, or lives in a particular town or neighborhood, the inserted content item may be a spoken mention of the college name or neighborhood, or a portion of the college fight song or alma mater. The enhancement of relative prominence for an audible inserted content item, or audible content placement point, may be managed in any suitable way.

Audible content placement points such as audio point 234 may be defined in any suitable manner. In one example, an audible content placement point may be defined by a start time and stop time, or a start time plus a duration, from a predefined origin time for the content item 204. The audible content placement points such as audio point 234 may be defined by a spatial location as well in some audio programming. For example, if a soundtrack for the content item 204 is in stereo, or includes enhanced sonic features, an audio content placement point such as audio point 234 may be inserted primarily in a left channel or a right channel of a stereo or multi-channel soundtrack, or may be made to vary or move between the channels in a dynamic fashion.

One way the human hearing mechanism (including the ears, nerves and brain processing, subsequently referred to as "the ear") detects placement of a speaker (or source of sound) is by detecting the relative volume perceived by the listener's two ears. A sound whose volume is stronger in the left ear appears to be coming from a position to the left of the listener. This stereo effect is used advantageously in nearly all modern music reproduction systems, and allows the creator of the music to position instruments left-to-right across the listener's virtual sound field. Another way the placement of a sound source is determined is by relative volume. A signal of lower volume sounds farther away than a signal of higher volume. Combined with the stereo effect, volume settings allow for, for example, near-left or far-right positioning of a sound source. A third way the human ear detects the position of a signal is a change in frequencies heard as a sound moves from the front of a listener's ear, where most frequencies are received with equal strength, to a position behind the listener's ear, where the higher frequencies are attenuated and the lower frequencies seem more apparent. In a virtual environment, this effect, combined with a decrease in volume and left-right positioning, may give the listener the impression that a sound source has moved behind the listener, even with a two channel stereo system. Additionally, changes to delay and echo may heighten this effect. Further, other parameter changes may provide the sensation that one participant is located behind another participant. Other enhancements or modifications may be made as well. The contents of U.S. Pat. No. 8,085,920 B1, issued Dec. 27, 2011, are incorporated herein by reference in their entirety. The sound design of the content item 204 may be adapted or modified to define audio content placement points such as audio point 234.

The system 216 may be configured to deliver content items such as content item 204 and placeable content items to the user device 200. The media content server 220 may receive over the network 228 a request for a content item, such as content item 204.

Figure 2C:
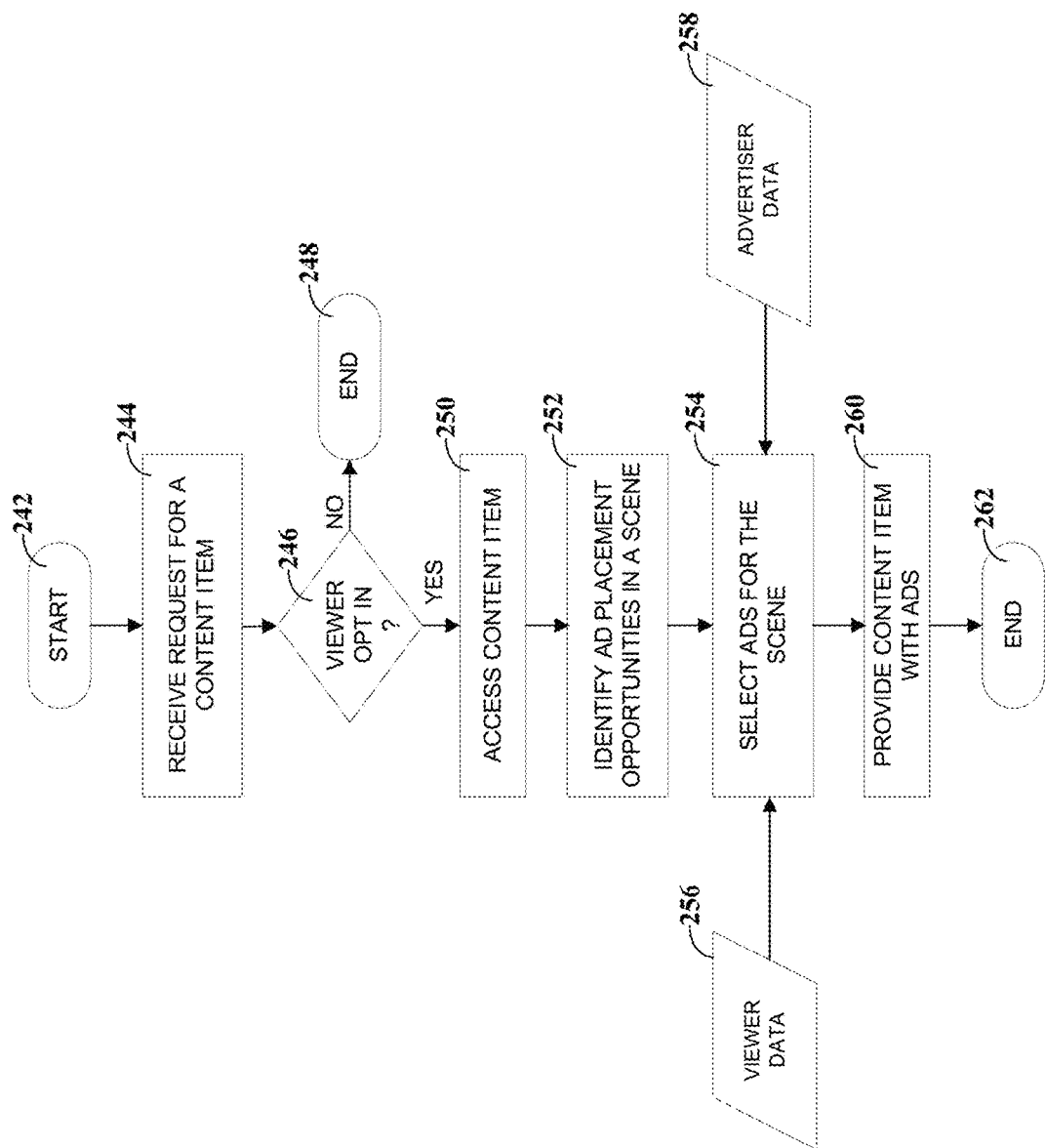
FIG. 2C depicts an illustrative embodiment of a method in accordance with various aspects described herein.

In an embodiment, the system 216 determines preferences of a viewer such as user 218 for targeting advertisements and other content to the viewer. FIG. 2C depicts an illustrative embodiment of a method 240 in accordance with various aspects described herein. The method 240 may be performed by a processing system including a processor and memory of, for example, the media content server 220 of FIG. 2B. In other embodiments, other components of a system may perform the method 240, either locally or in conjunction with other components accessible over a network such as network 228. In one example, some or all of the operations of method 240 may be performed by the user device 200 or by a smart television or set top box or other media content device associated with a viewing device. The method begins at block 242.

At block 244, the method 240 includes an operation of receiving a request for a content item. The request may originate at a user device such as user device 200, FIG. 2B, or any other source. For example, a user such as user 218 of user device 200 may operate a user interface of the user device 200 to locate and select a content item of interest, such as a film or television program or stored video item. The user interface may present a menu of viewing options, for example, by accessing over the network 228 the media content server 220. The user 218 selects the content item of interest using the menu and the selection is communicated over the network 228 as a request for the content item to the media content server 220. The request for the content item may include any suitable information, such as identification information for the content item, identification information for the user device 200, identification information for the user 218, identification information for an account of the user 218 and identification information for other viewers present with the user 218 who will view the requested content item.

At block 246, the method 240 includes an operation to determine if viewers such as the user 218 have agreed to use of their personal or confidential information or data in a system and process for providing content. This operation may be important to protect and keep confidential such information for viewers who are sensitive about the use of such information. Such an agreement may be provided by the user agreeing to the use of confidential information for purposes such as providing content items and the agreement may be recorded at a network location accessible by operations of the method 240. If the user 218 or viewers present with the user, have not opted in to the service, the operation ends at block 248. In such a case, the requested content item will be provided to the user device without modification.

If the viewers or user have opted in to the service, at block 250, the method 240 includes an operation of accessing the requested content item. In one example, in the system 216 of FIG. 2B, the media content server 220 access the media content database 222 to locate the requested content item. If the media content database 222 does not already store the requested content item, the media content server 220 may access other locations to obtain the requested content item.

At block 252, the method 240 includes an operation to identify insertion opportunities in the requested content item. In one example, the requested content item includes a number of scenes, such as a scene including images 202, 206 of FIG. 2A. In each respective scene, one or more content placement opportunities is identified. For each respective content placement opportunity of the one or more content placement opportunities, a prominence score is determined. Examples of prominence scores are described in conjunction with Table 1 and Table 2 and FIG. 2B. In some embodiments, content placement opportunities may include opportunities to insert advertisements for consumption by viewers of the selected content items. The advertisements and other content items may include visible content such as still images, video segments, and others. The advertisements and other content items may also include audible content items such as background sounds, dialog of characters, background dialog, and others. An operator of the media content server 220 may provide a paid service of providing advertisements to viewers for advertisers.

At block 254, the method 240 includes an operation of selecting content items such as advertisements for the scene. Particular content items may be chosen for insertion into the content placement opportunities for any suitable reason. Block 254 in some embodiments may include steps of accessing user data 256 and accessing advertiser data 258.

In order to target advertising to viewers of the selected content item, the method 240 includes accessing user data 256. The user data 256 may include any information provided by users or other viewers or information collected about the viewers or users. The user data 256 may be used to develop a preference profile for the user. The preference profile includes information about likes and desires and interests of the user, as well as dislikes of the user. The preference profile for the user may be developed and modified over time as more information about the user is gathered and stored.

For example, a user's previous content selections from the media content server 220 may be retrieved. In another example, the user's previous purchase history of items, including media content items and other items, from online sources or in other retail locations, may be retrieved. Other information about the user may be retrieved as well, including geographic information, demographic information, psychographic information and behavioral information of the user or other viewers of the requested media content. The media content server 220 may have access to such information at the media content database 222. In other examples, the media content sever 220 may have access over networks such as the network 228 to other stored information, including the noted information, about the user or viewers. In still other examples, the media content server 220 may access particular information of the user or viewers and operate to draw inferences therefrom about interests of the user or viewers. For example, a machine learning algorithm may be used to develop a model for the user and user interests and to make predictions about user preferences. The predictions and all other information about the user and other viewers may be used to select advertising or other content items at block 254. In some examples, the user may be associated with one or more advertising targeting segments. Such segment information may be accessed as well at block 254.

Also at block 254, the method may include accessing advertiser data 258. In one example, the advertisement data 258 may be received from the advertisement database 226 or the advertisement engine 224, or a combination of these. Advertiser data 258 may be received from respective advertisers about advertisements of the advertiser to be placed or included in content placement opportunities of the requested content item. Advertiser data 258 may include data defining content and advertisements including data files of visual advertising components any suitable format such as JPEG, MPEG or others. The advertiser data 258 may also include data defining content and advertisements including data files of audible advertising components in any suitable format, such as .wav, .aac and others. Further, the advertiser data 258 may include targeting information such as segments targeted by the advertiser for a particular product or campaign. Further, the advertiser data 258 may include information defining compensation the advertiser is willing to pay, such as a money amount, for placement of a particular advertisement in a content placement opportunity of the requested content item.

The advertiser data 258 may be used to determine which advertisement is selected for placement in a content placement opportunity of the requested content item. In that regard, information about one or more advertisements or advertisers from the advertiser data 258 may be compared with information about the user or viewers from the user data 256 at block 254. Based on the comparison, one or more advertisements are selected for presentation in content placement opportunities of the scene of the requested content item.

Still further, the advertiser data 258 may include prominence information defining a degree of prominence to be used for each advertisement or content item of an advertiser. The advertiser may specify the respective prominence information for a respective advertisement. The degree of prominence may be expressed in any suitable manner, such as an advertiser's prominence designator or prominence score. The prominence designator or prominence score may be used to determine how an advertisement should be presented or which advertisement should be provided.

In some embodiments, block 254 includes operations of determining, for each respective content placement opportunity of the content item, a respective relative prominence score. In an example, determining the respective relative prominence score may include determining the relative prominence score based on a relative importance in a scene of the respective content placement opportunity. When the content item is delivered to the user device, content items are selected to populate the content placement opportunities. Selecting the content items, or advertisements in some examples, may include selecting a respective content item for each respective content placement opportunity according to the respective relative prominence score for the respective content placement opportunity. For a more prominent content placement opportunity, a more prominent advertisement may be selected. In some examples, relative prominence of an advertisement may be determined by an amount an advertiser is willing to pay to have the advertiser's advertisement placed in that content placement opportunity.

As noted, the user data 256 may be used to develop a preference profile for the user. Similarly, the advertiser data 258 may be used to develop and advertisement profile. The advertisement profile may form an indication of the type of viewers or consumers an advertiser is targeting for the advertisements of the advertiser. The advertisement profile may be for the advertiser, for individual advertisements, also referred to as campaigns or line items, or for groups of advertisements. The preference profile may be matched against advertisement profiles to select one or more advertisements suitable to show to the user.

The profile matching may be done in any suitable manner. In one example, the advertisement profile includes definitions of a number of audience segments. The segments identify characteristics of viewers of interest to the advertisers, such as Interested in Purchasing a New Car, New Parent, and Interested in Vacations to Tropical Destinations. Similarly, based on activities of the user, including purchases, viewing patterns, online activity, and information such as demographic, geographic, psychographic and behavioral information, the user may be placed into a plurality of audience segments. For example, if the viewer has requested and watched a television program about Hawaiian resort vacations, the view may be placed in the segment Interested in Vacations to Tropical Destinations. Similarly, if the user has purchased new baby clothes and other new baby items online, the user may be placed in the segment New Parent. To match the user's preference profile with the advertiser's advertisement profile then requires finding common segments among the two. Any other suitable method of matching users and advertisements may be used.

The prominence information may be used to select which advertisement is selected for a particular content placement opportunity or how the advertisement is presented. The prominence information for an advertisement may include relative levels that advertisers are willing to pay for their ads to be presented at content placement opportunities in the requested media content item. In one embodiment, advertisers may submit bids for advertisement placement, where each bid corresponds to a desired relative prominence in a scene. The advertiser may bid $1.00 to be placed in the most prominent location in a scene, $0.50 for the second most prominent location in the scene, $0.30 for the third most prominent location, etc. Relative prominence of locations may be determined based on a prominence score as illustrated in Table 1 and Table 2, for example. The bid amounts may be considered respective prominence information of the advertisers associated with the advertisements.

In an embodiment, an ad call is received to fill a group of ad placement opportunities is received. Each ad placement opportunity has a respective relative prominence as illustrated, for example, in FIG. 2B. In response to the ad call for the scene, an auction may be conducted, such as by the advertisement server, to determine which advertisements should be selected to fill the ad calls for the scene. For example, the highest paying advertiser whose ad is a match for the user's preference profile may be presented in Ad Opportunity 1, the most prominent advertisement opportunity in the example of FIG. 2B. Other content placement opportunities are filled according to bid amounts and the requested content item is presented with the ads inserted.

Further, the prominence information may be used to adjust the relative prominence of presentation of an advertisement other content item. For example, if an advertiser desires heightened prominence for an audio content item, the volume of the content item, or its duration, may be increased when the content item is inserted in the requested content item. In another embodiment, if the advertiser pays a higher fee for heightened prominence, a visual item may be modified to cause it to be more visually arresting, such as with added dazzle or brighter colors or colors selected with high contrast to background colors. Other types of prominence modification or adaptation may be performed as well.

At block 260, the method 240 includes an operation of presenting the requested content item in response to the request received at block 244. The requested content item, with content items selected at block 254, is provided in any suitable manner. For example, the requested content item may be prepared by the media content server 220 in full, with the selected content items inserted at each content placement opportunity, and stored, for example, at the media content database 222. The prepared content item may then be communicated in full, as an entire file, to the user device 200.

In another example, the prepared content item may be streamed to the user device 200, with selected portions of video content including inserted content items, sent in sequence. In such an embodiment, as the video content is being presented at the user device, the user device or other playback device may detect a content placement opportunity. In response, the user device will generate an ad call. The media content server or the advertisement server will accordingly receive a call for a content item from the display device while delivering the media content over the network to the display device. The call for the content item corresponds to a viewing opportunity in the media content. Responsive to the ad call, the media content server or advertisement server may determine a respective relative prominence score for the viewing opportunity and select a content item or advertisement for the viewing opportunity according to the respective relative prominence score for the viewing opportunity. Based on relative prominence, the media content server may provide the selected content item to the display device. In this embodiment, each content placement opportunity is filled in response to a series of ad calls. This embodiment may reduce data processing and storage requirements of the media content server and better regulate traffic on the network 228 by only sending content to the user device 200 when required.

In another example, the operations of block 250, block 252, block 254 and block 260 may be performed in a loop. In such an embodiment, the requested content item is processed in portions, such as scene by scene, to identify ad insertion opportunities of each processed scene, block 252, and to select ads for the processed scene, block 254, and then provide the content including the processed scene to the user device 200. Operations are then repeated for a next scene. In this manner, the ads are inserted into the requested content on essentially a real time basis, as the content is retrieved and presented to the user. Such an embodiment may reduce processing time and storage requirements of the media content server 220.

The content items delivered at block 260 may delivered with any suitable data or other information. In one embodiment, in order to ensure reliable placement of the content items or advertisements in the media convent, the media content may be delivered with a content tag. The content tag includes, for example, a time stamp and metadata. The metadata may include a prominence indicator. The prominence indicator may provide an indication of how prominently the content item associated with the content tag should be displayed. The metadata of the content tag may include any other useful information for organizing and controlling how the content or advertisement is presented, visually or audibly. The method ends at block 262.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
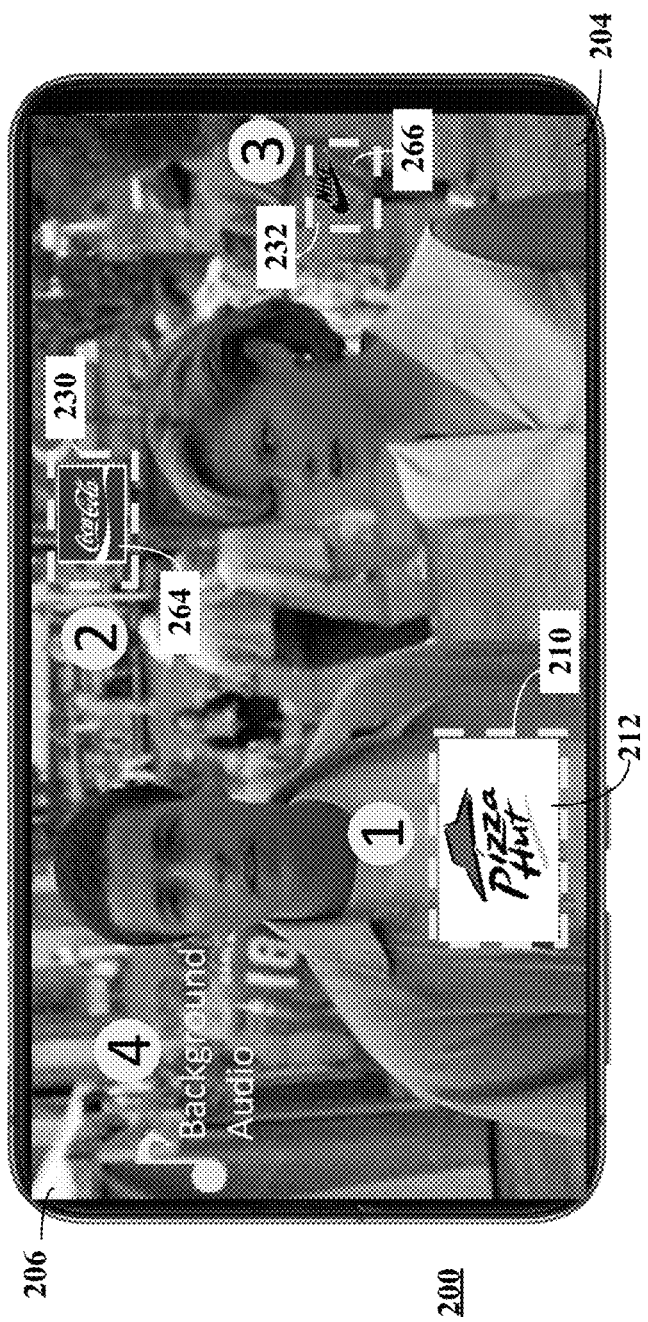
FIG. 2D is a block diagram showing an exemplary user device displaying a content item in which other content items have been inserted in content delivery opportunities in accordance with the method of FIG. 2C.

FIG. 2D is a block diagram showing user device 200 displaying image 206 of content item 204 in which advertisements have been inserted in the content delivery opportunities of the content item 204. By operation of the method 240 of FIG. 2C, for example, or by any other suitable operation, suitable ads have been selected and placed with relative prominence in the image 206. Thus, second logo 212 has been placed in area 210 with a highest relative prominence. The second logo 212 are area 210 has a highly prominent position because, in this example, it is in the foreground of the image 206 and it is associated with a main character. In fact, in this example, the main character speaking in the scene, heightening the prominence of the area 210 and second logo 212 and the second logo 212 is placed on clothing of the character, in intimate association with him.

A third logo 264 has been placed in area 230 of the image 206. This may be considered, in this example, to be an area of relatively low prominence. First, the area 230 and the third logo 264 are located in the deep background of the image 202. Second, the area 230 and the third logo 264 are static and not in motion. Third, the area 230 and the third logo 264 are not associated with the characters in any obvious way.

A fourth logo 266 has been placed in area 232 of the image 206. This may be considered, in this example, to be an area of relatively moderate prominence, less prominent in the scene and image 206 than are 210 but more prominent than are 230. First, the area 232 and the fourth logo 266 are in the mid-background of the scene. Second, the area 232 and the fourth logo 266, while not associated with one of the two main characters of the scene are in motion and attached to a background character. The factor of motion enhances the relative prominence of the area 232 and the fourth logo 266.

Audible advertisements may similarly be selected and placed in accordance with the method 240 of FIG. 2C. The prominence of audible advertisements may be matched with relative prominence of the content placement opportunity associated with the sound design of the scene depicted in image 206. If the primary characters in the image 206 are talking in the scene, the background sound may be of reduced prominence. However, if an advertising jingle is selected as the content item to be placed as the background audio for the scene, the content item of the advertising jingle may have heightened prominence in the scene. Moreover, if an advertising jingle or other audible content item is select to correlate with a visible content item such as one of the second logo 212, the third logo 264 or the fourth logo 266, the relative prominence of both the audible content item and the visible content item may be enhanced. The system and method in accordance with various aspects disclosed herein may be adapted to particular circumstances to modulate relative prominence of content items such as the second logo 212, the third logo 264 or the fourth logo 266 and an audible content item placed in a scene including image 206 of content item 204

Figure 2E:
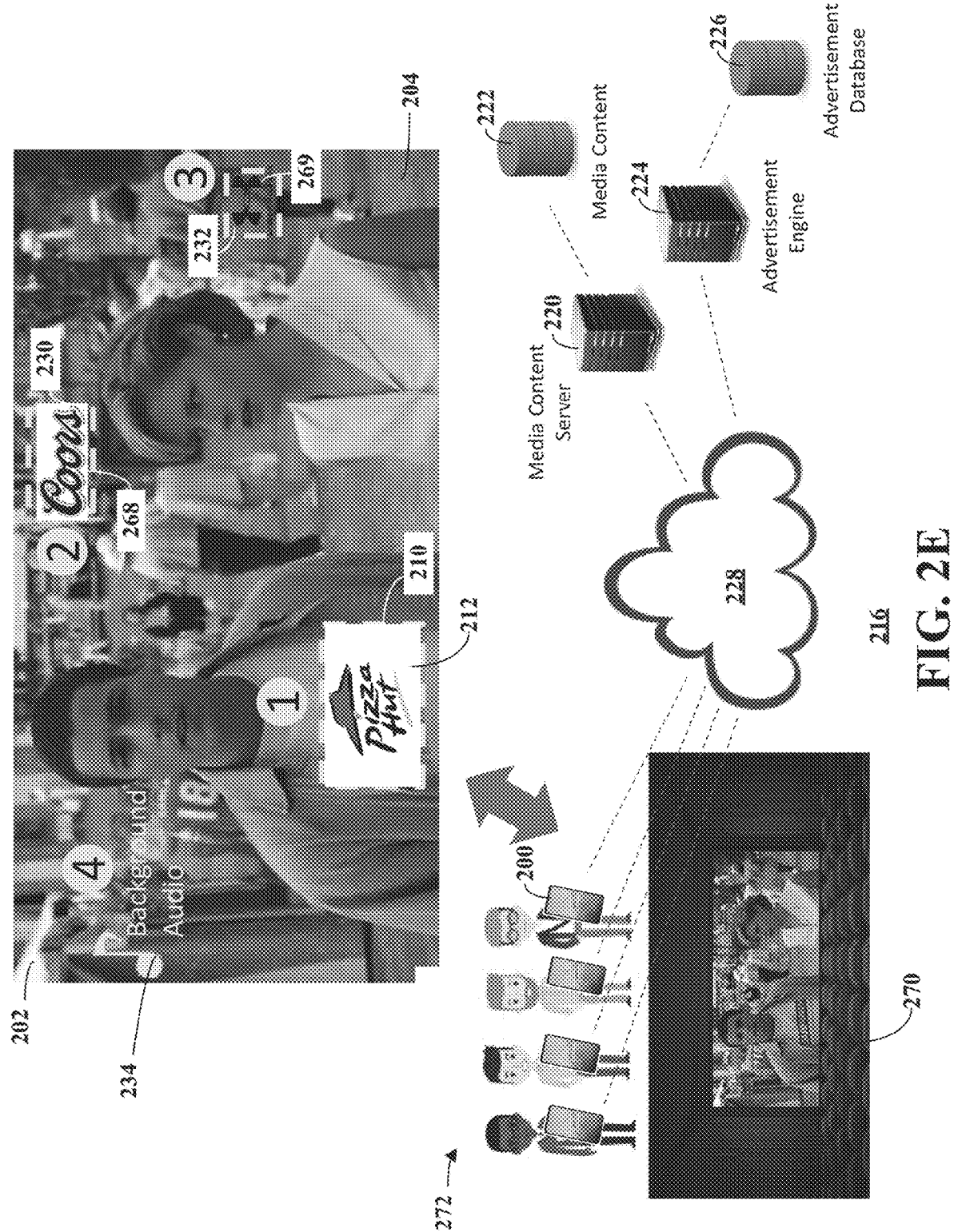
FIG. 2E is a block diagram illustrating an example, non-limiting embodiment of a system for displaying a content item while delivering media content to a media display device such as user device and functioning within the communication network of FIG. 1 in accordance with various aspects described herein.

FIG. 2E is a block diagram illustrating an example, non-limiting embodiment of a system 216 for displaying a content item 204 while delivering media content to a media display device and functioning within the communication network of FIG. 1 in accordance with various aspects described herein. In the embodiment of FIG. 2E, the media display device is implemented in an environment 270 for viewing by an audience of several or many individuals 272. One example of an environment 270 is a theater when the content item 204 is displayed on a screen such as by projection on a movie screen or by display on a relatively large electronic display.

In the embodiment of FIG. 2E, content placement opportunities of the content item 204 have been filled with content items such as advertisements, for example in accordance with the method 240 of FIG. 2C. Thus, in the example of FIG. 2E, second logo 212 has been placed in area 210; fifth logo 268 has been placed in area 232; and sixth logo 269 has been placed in area 232. Suitable audible content has been provided as background audio at audio point 234.

In the embodiment of FIG. 2E, each individual 272 of the audience has a user device 200. However, instead of displaying content item 204 on the user device 200, each user provides inputs and other information to the system 216. For example, each respective user device 200 may communicate with the media content server 220 and the advertisement engine 224 to provide information about each respective individual 272 associated with the respective user device 200. Such information may include identification information for the individual 272 or the user device 200 or account associated with the individual. Such information may include an opt-in indicator for the individual 272 to share the individual's confidential information. Such information may include, or be used to determine from the advertisement engine 224, individual preference information for each respective individual 272. In this manner, the method 240 of FIG. 2C can be modified to provide advertisements and other content items for consumption by the individuals 272 in the environment 270. Consumption of advertisements includes viewing visible advertisements and hearing audible advertisements.

In this embodiment, the media content server 220 may develop an aggregate audience score based on respective preference profiles of the individuals 272. This may be done in any suitable fashion, such as by averaging or otherwise aggregating user interests. The media content server 220 may then use the aggregate audience score to determine an aggregate preference profile of the audience as a whole. The aggregate audience score, or the aggregate preference profile, may be used by the media content server 220 to make determinations of which ads to insert and at what level of prominence. This might occur, for instance, in a movie theater or other environment 270.

The user devices 200 may further be used to collect audience feedback or other information from individuals 272 of the audience. For example, each user device 200 may be equipped with an application, or app, which collects information from the user device 200 and communicates the information over the network 228 to the media content server 220 and the advertisement engine 224. The viewers may use the app on their respective user device 200, for example, to vote for which products to see in the movie.

In another embodiment, the audience of individuals 272 may act as a collective crowd before the movie begins to influence the number of ads that get inserted. In an example, if the audience contributes an amount to a charity by appropriate actuation of the app on their user device 200, no ads or a reduced number of ads may be inserted. The media content server 220 may prompt this interaction by individuals 272, collect the responses and respond accordingly. Other activities and modifications may be implemented using the ability to aggregate audience information and responses by the media content server 220 and advertising engine 224.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of system 216, and method 240 presented in FIGS. 1, 2A, 2B, 2C, 2D, 2E and 3. For example, virtualized communication network 300 can facilitate in whole or in part providing a content item such as a video or other media content item to virtual network elements (VNEs) 330, 332, 334, wherein the content item includes a plurality of content placement opportunities which each have a relative prominence in a scene or portion of the content item, and providing advertisements or other content items according to desired prominence so that, for example, an advertisement having a highest desired prominence by an advertiser is placed most prominently in the content item.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
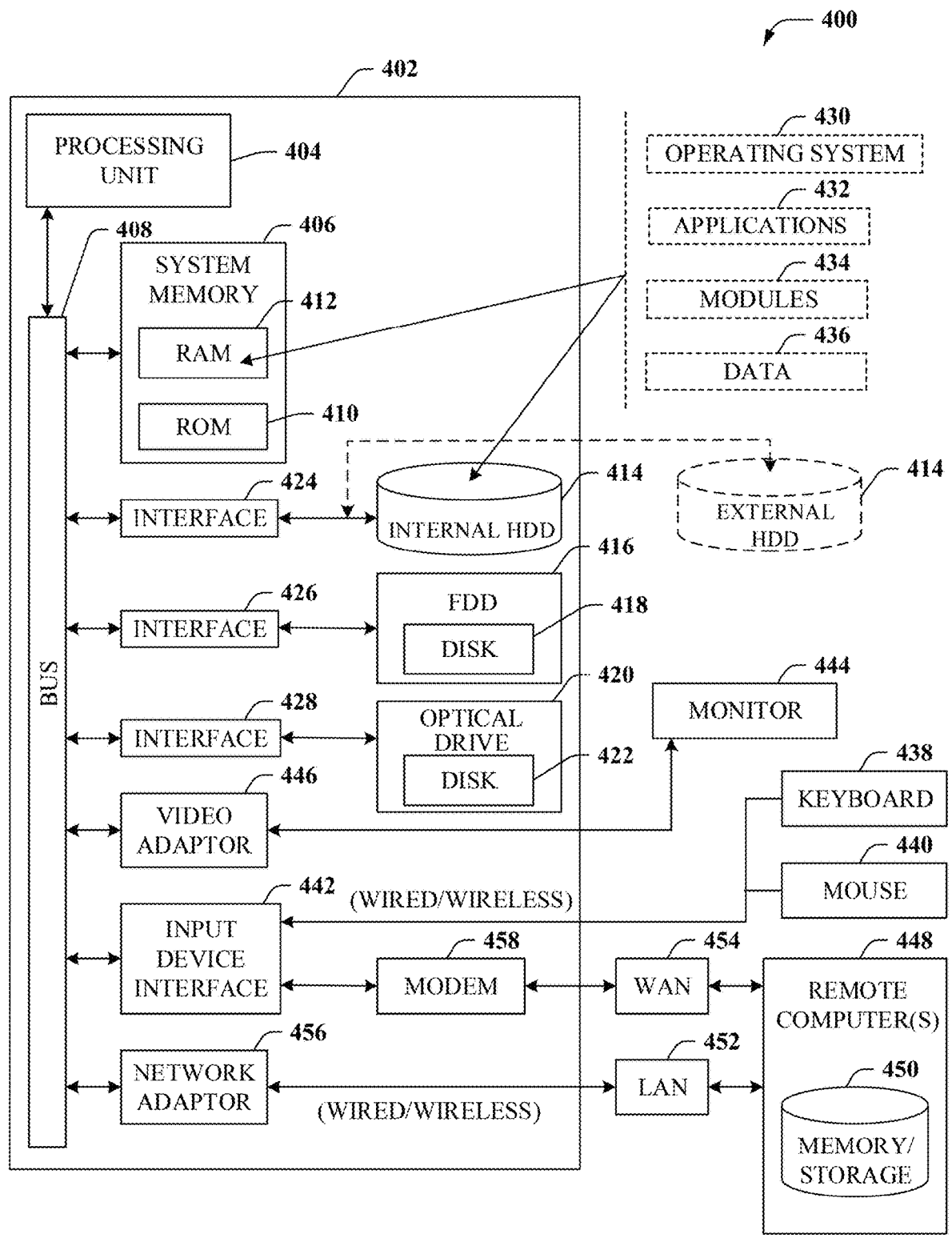
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part providing a content item such as a video or other media content item to implementations of audio/video display devices 144, data terminals 114, or other network elements 150, 152, 154, 156, wherein the content item includes a plurality of content placement opportunities which each have a relative prominence in a scene or portion of the content item, and providing advertisements or other content items according to desired prominence so that, for example, an advertisement having a highest desired prominence by an advertiser is placed most prominently in the content item.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
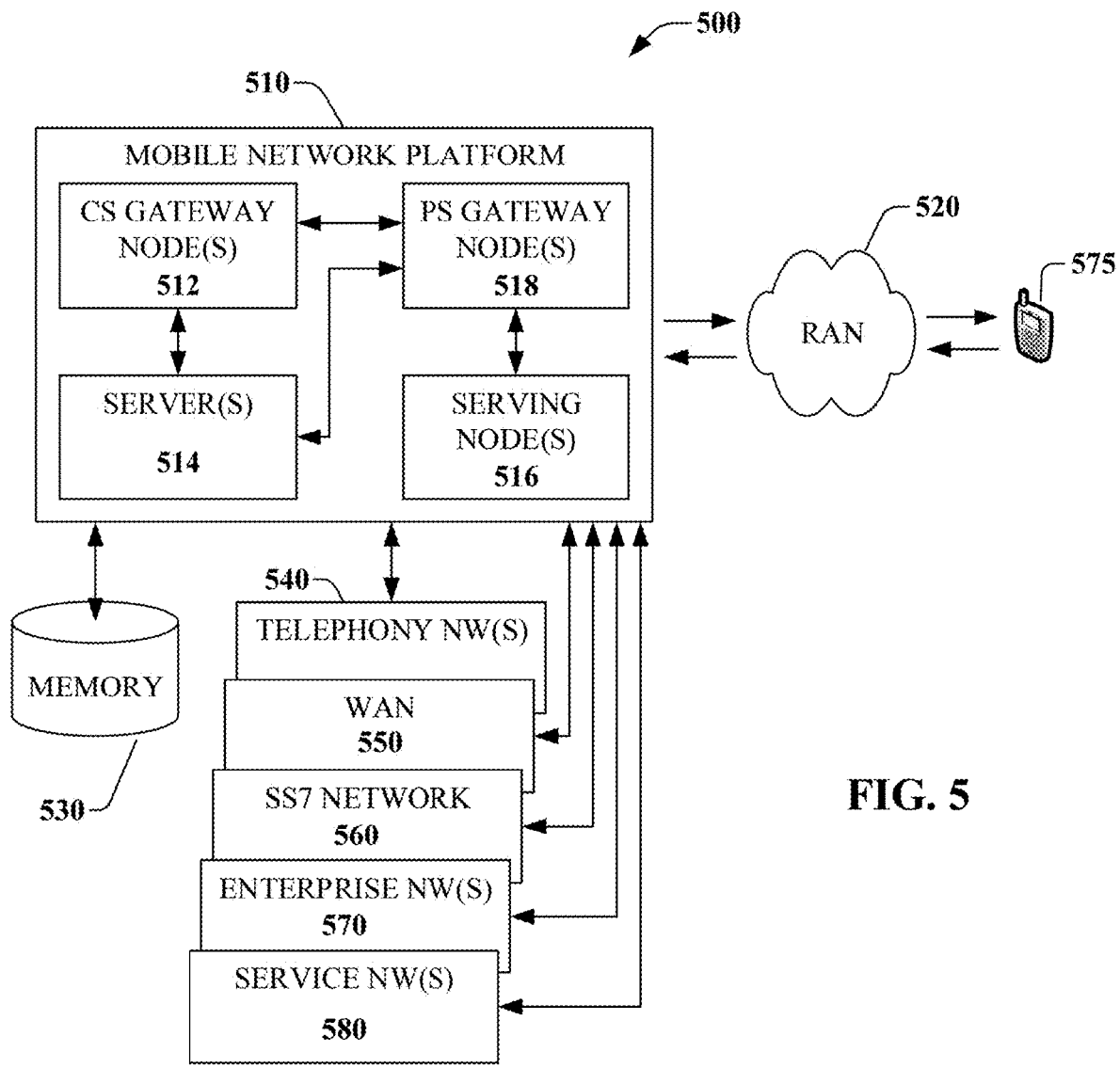
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part providing a content item such as a video or other media content item to user devices such as user device 200 of FIG. 2B, wherein the content item includes a plurality of content placement opportunities which each have a relative prominence in a scene or portion of the content item, and providing advertisements or other content items according to desired prominence so that, for example, an advertisement having a highest desired prominence by an advertiser is placed most prominently in the content item.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
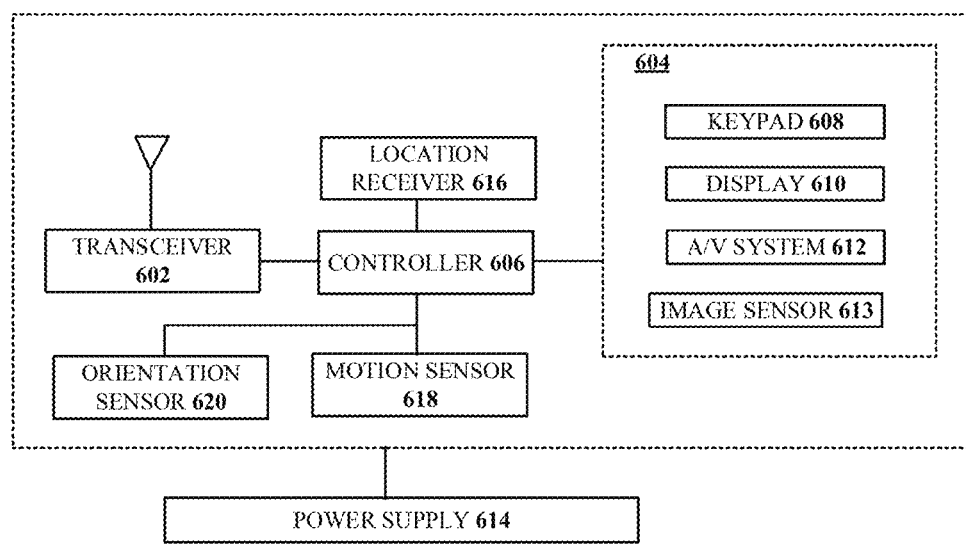
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 receiving over a network from a server a content item such as a video or other media content item, wherein the content item includes a plurality of content placement opportunities which each have a relative prominence in a scene or portion of the content item, and receiving advertisements or other content items according to desired prominence so that, for example, an advertisement having a highest desired prominence by an advertiser is placed most prominently in the content item by the computing device.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) or machine learning (ML) or a combination of these to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence or machine learning or a combination of these (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantumdot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
receiving, over a network, a request to deliver media content to a media display device;
detecting a plurality of content placement opportunities in the media content;
determining, for each respective content placement opportunity of the plurality of content placement opportunities, a respective relative prominence score, wherein the determining the respective relative prominence score comprises determining the respective relative prominence score based on a relative importance in a scene of the respective content placement opportunity;
delivering the media content over the network to the media display device;
selecting a plurality of content items, wherein the selecting comprises selecting a respective content item for each respective content placement opportunity of the plurality of content placement opportunities according to the respective relative prominence score for the respective content placement opportunity; and
delivering the respective content item over the network to the media display device.

2. The device of claim 1, wherein the detecting a plurality of content placement opportunities in the media content comprises detecting one or more of a still image placement opportunity, a video image placement opportunity, and an audio placement opportunity.

3. The device of claim 2, wherein the detecting a plurality of content placement opportunities in the media content comprises detecting a background audio placement opportunity and a foreground audio placement opportunity.

4. The device of claim 1, wherein the delivering the respective content item over the network to the media display device comprises delivering with the media content a content tag, the content tag comprising a time stamp and metadata, the metadata comprising a prominence indicator.

5. The device of claim 1, wherein the operations further comprise:
detecting a viewing opportunity in the media content while delivering the media content over the network to the media display device;
determining a respective relative prominence score for the viewing opportunity;
selecting a content item for the viewing opportunity according to the respective relative prominence score for the viewing opportunity; and providing the selected content item to the media display device.

6. The device of claim 1, wherein the operations further comprise:
receiving a call for a content item from the media display device while delivering the media content over the network to the media display device, the call for the content item corresponding to a viewing opportunity in the media content;
determining a respective relative prominence score for the viewing opportunity;
selecting a content item for the viewing opportunity according to the respective relative prominence score for the viewing opportunity; and
providing the selected content item to the media display device.

7. The device of claim 1, wherein the operations further comprise:
determining profile information for an audience viewing the media content; and
selecting the plurality of content items based, at least in part, on the profile information.

8. The device of claim 7, wherein the determining the profile information for the audience comprises determining aggregate profile information for a plurality of audience members of the audience, and wherein selecting the plurality of content items comprises selecting content items based, at least in part, on the aggregate profile information.

9. The device of claim 1, wherein the detecting a plurality of content placement opportunities in the media content comprises detecting audio content placement opportunities and wherein the delivering the respective content item over the network to the media display device comprises delivering an audio clip to the media display device for playback.

10. The device of claim 9, wherein the delivering an audio clip to the media display device for playback comprises delivering a segment of prerecorded audio containing dialogue including a product name in place of other audio content of the media content.

11. A method, comprising:
providing, by a processing system including a processor, a content item to a media display device;
detecting, by the processing system, a plurality of content placement opportunities in a scene of the content item, each respective content placement opportunity of the plurality of content placement opportunities having a relative prominence in the scene of the content item;
detecting, by the processing system, a preference profile for a user of the media display device;
identifying, by the processing system, a first plurality of matching advertising items, wherein the matching advertising items match the preference profile for the user;
selecting, by the processing system, a second plurality of matching advertising items according to respective prominence information of the first plurality of matching advertising items; and
providing, by the processing system, the second plurality of matching advertising items to the media display device, each respective matching advertising item of the second plurality of matching advertising items associated with a respective content placement opportunity of the plurality of content placement opportunities.

12. The method of claim 11, further comprising:
determining, by the processing system, a respective relative prominence score for each respective content placement opportunity of the plurality of content placement opportunities; and
selecting the second plurality of matching advertising items according to advertiser bid amounts, wherein the selecting comprises selecting a matching advertising item having a highest bid amount for a content placement opportunity having a highest relative prominence score and selecting a matching advertising item having a next-highest bid amount for a content placement opportunity have a next-highest relative prominence score.

13. The method of claim 12, wherein the determining a respective relative prominence score for each respective content placement opportunity of the plurality of content placement opportunities comprises determining the respective relative prominence score based on one or more of a size, an importance, a degree of motion and a duration of the each respective content placement opportunity, wherein the each respective content placement opportunity comprises a video or still image placement opportunity.

14. The method of claim 12, wherein the determining a respective relative prominence score for each respective content placement opportunity of the plurality of content placement opportunities comprises determining the respective relative prominence score based on one or more of a volume, a relevance, a degree of musicality and a duration of each respective content placement opportunity, wherein each respective content placement opportunity comprises an audio placement opportunity.

15. The method of claim 14, wherein the selecting the second plurality of matching advertising items comprises selecting, by the processing system, a product jingle for playing as background music in the scene of the content item.

16. The method of claim 14, wherein the selecting the second plurality of matching advertising items comprises generating, by the processing system, a portion of audio dialogue that contains a product name for playing as background sound in the scene of the content item.

17. The method of claim 11 wherein the providing the second plurality of matching advertising items to the media display device comprises providing the second plurality of matching items with the content item to an audience comprising a plurality of individuals, and further comprising:
receiving, by the processing system, user information for the plurality of individuals;
aggregating, by the processing system, audience features based on the user information for the plurality of individuals to produce aggregated audience features; and
identifying, by the processing system, the first plurality of matching advertising items, wherein the matching advertising items match the aggregated audience features.

18. A non-transitory, machine-readable medium, comprising executable instructions that, when executed by a processing system including a processor, facilitate performance of operations, the operations comprising:
providing to a user device a video content item, the video content item including a plurality of scenes, at least one scene of the plurality of scenes including a plurality of advertisement placement opportunities;
determining a preference profile for an individual associated with the user device;

selecting a group of matching advertisements having advertisement profiles that match the preference profile for the individual;

determining a respective relative prominence score for each respective advertisement placement opportunity of the plurality of advertisement placement opportunities;

ordering matching advertisements of the group of matching advertisements according to respective prominence information specified for each respective matching advertisement to produce ordered matching assignments, wherein the respective prominence information corresponds to a relative desired prominence specified by an advertiser associated with the matching advertisements; and providing the ordered matching advertisements to the user device according to the respective prominence information so that a matching advertisement having a greatest respective desired prominence is displayed in the video content item at an advertisement placement opportunity having a highest relative prominence score.

19. The non-transitory, machine-readable medium of claim 18, wherein the determining the respective relative prominence score for each respective advertisement placement opportunity of the plurality of advertisement placement opportunities comprises determining the respective relative prominence score based on one or more of a size, an importance, a degree of motion and a duration of the each respective advertisement placement opportunity, wherein the each respective advertisement placement opportunity comprises a video or still image placement opportunity.

20. The non-transitory, machine-readable medium of claim 18, wherein the operations further comprise selecting one or more audio advertisements according to respective audio desired prominence information for a plurality of audio advertisements so that an audio advertisement having highest respective desired audio prominence is played in the at least one scene of the video content item.

* * * * *